United States Patent
Kitagata

(10) Patent No.: US 8,788,699 B2
(45) Date of Patent: Jul. 22, 2014

(54) INFORMATION PROCESSING APPARATUS AND DOCUMENT DATA PRODUCING METHOD

(75) Inventor: Kei Kitagata, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 479 days.

(21) Appl. No.: 13/046,932

(22) Filed: Mar. 14, 2011

(65) Prior Publication Data

US 2011/0238859 A1   Sep. 29, 2011

(30) Foreign Application Priority Data

Mar. 25, 2010   (JP) .................................. 2010-069176

(51) Int. Cl.
   *G06F 15/16*   (2006.01)
(52) U.S. Cl.
   USPC ........... 709/232; 709/202; 709/203; 709/217; 709/231
(58) Field of Classification Search
   USPC ..................... 709/232, 202, 203, 217, 231
   See application file for complete search history.

(56) References Cited

U.S. PATENT DOCUMENTS

| | | | |
|---|---|---|---|
| 7,474,429 B2 | 1/2009 | Morooka et al. | |
| 2006/0069744 A1* | 3/2006 | Alberti et al. | 709/217 |
| 2008/0270524 A1* | 10/2008 | Gupta et al. | 709/203 |
| 2009/0111433 A1* | 4/2009 | Muhonen et al. | 455/414.1 |
| 2012/0311425 A1* | 12/2012 | Auffray et al. | 715/226 |

FOREIGN PATENT DOCUMENTS

JP   2002-140276   5/2002

* cited by examiner

*Primary Examiner* — Lan-Dai T Truong

(74) *Attorney, Agent, or Firm* — Fitzpatrick, Cella, Harper & Scinto

(57) ABSTRACT

A document production apparatus produces document data as well as determines whether or not the size of document data exceeds a threshold value when the document production apparatus receives a document data production request and a document data upload request from the client apparatus. The document production apparatus uploads document data to a cloud platform when the size of document data is less than or equal to the threshold value. The document production apparatus provides a notification to prompt a client apparatus to download document data when the size of document data exceeds the threshold value.

12 Claims, 12 Drawing Sheets

| OVERLAY-TARGET DATA TABLE ||||||
|---|---|---|---|---|---|
| TABLE ID ||||||
| ITEM | DATA ID | PRODUCT NAME | QUANTITY | PRICE | ... |
| DATA | 1 | YYYY/MM/DD | 10000 | 1000 | ... |
| | 2 | YYYY/MM/DD | 2000 | 500 | ... |
| | 3 | ... | ... | ... | ... |

501

INFORMATION PROCESSING APPARATUS AND DOCUMENT DATA PRODUCING METHOD

This application claims the benefit of Japanese Patent Application No. 2010-069176 filed Mar. 25, 2010, which is hereby incorporated by reference herein in its entirety.

BACKGROUND OF THE INVENTION

1. Field of the Invention

The present invention relates to an information processing apparatus and a document data producing method.

2. Description of the Related Art

In recent years, there has been proposed a cloud service in which a cloud platform on the Internet executes a process for a service requested from a client to thereby provide execution results to the client. The client, which requests a service to the cloud service, is located in a local area network where external access is limited. Japanese Patent Laid-Open No. 2002-140276 discloses an image communication apparatus for transmitting image data attached to an e-mail. The image communication apparatus detects the size of the file attached to an e-mail to be transmitted, and issues a warning as well as interrupts the transmission of the e-mail when the size of the attached file exceeds the acceptable amount.

A document production service that executes a document production process requested from a client in conjunction with a cloud service to thereby provide execution results to the client is contemplated. The document production service overlays data such as client's work information or the like managed by a cloud platform and the form managed by the document production service to thereby produce document data (e.g., document file). Here, the document production service may upload the produced document file to the cloud platform in response to a request from a client. In such a case, the cloud platform functions as a virtual document file management server for managing a document file.

However, some cloud platforms set a limit on the uploadable file size. In the cloud platform, service is published on the Internet, and many users share resources in a multi-tenant environment. Therefore, some cloud platforms may set a limit on the uploadable file size to avoid resources from being exhausted by a specific user(s).

An error occurs when a system, which provides a document production service in conjunction with a cloud service with its uploadable file size being limited, uploads a file that exceeds the size limitation to a cloud platform. As a result, the produced document file cannot be provided to a client. In addition, when an error occurs while uploading, the cloud platform needlessly executes processing (e.g., API call) performed when uploading a document file.

SUMMARY OF THE INVENTION

The information processing apparatus of the present invention is an information processing apparatus that can provide document data to a user device upon receiving an upload request for uploading document data to a management server from the user device, even when the size of document data exceeds the uploadable size.

According to an aspect of the present invention, an information processing apparatus is provided that produces document data in response to a request from a user device located in a network where access from a management server is limited. The information processing apparatus includes a request reception unit configured to receive a document data production request from the user device and an upload request for the produced document data to the management server or a download request for the document data to the user device; a document production unit configured to produce the document data in response to the document data production request; an uploading unit configured to determine whether or not the size of the produced document data exceeds a predetermined threshold value when the request reception unit receives the upload request, upload the document data to the management server when the size of the document data is less than or equal to the threshold value, and provide a notification to prompt the user device to download the document data when the size of the document data exceeds the threshold value; and a downloading unit configured to download the produced document data to the user device when the request reception unit receives the download request.

Further features of the present invention will become apparent from the following description of exemplary embodiments with reference to the attached drawings.

DESCRIPTION OF THE EMBODIMENTS

Figure 1:
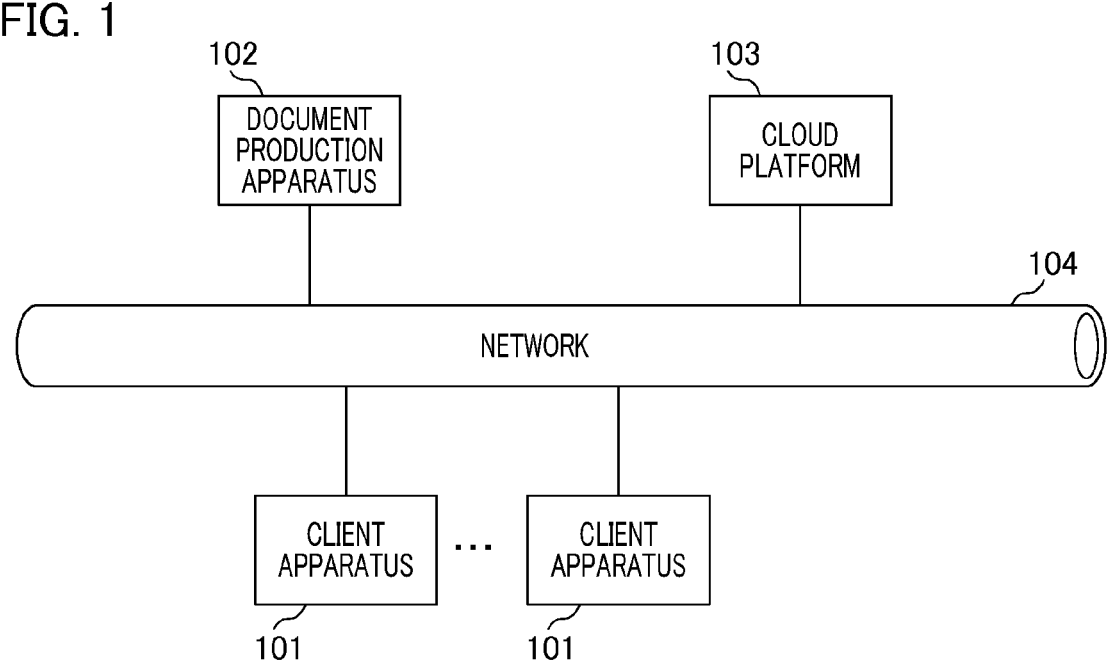
FIG. 1 is a diagram illustrating an exemplary configuration of a document production system of the present embodiment.

FIG. 1 is a diagram illustrating an exemplary configuration of a document production system of the present embodiment. The document production system shown in FIG. 1 includes a client apparatus 101, a document production apparatus 102, and a cloud platform 103. The client apparatus 101, the document production apparatus 102, and the cloud platform 103 are connected to each other via a network 104. The network 104 is, for example, the Internet. The network 104 may be a LAN (Local Area Network), a WAN (Wide Area Network), a telephone line, or a dedicated digital line. Also, the network 104 may be in ATM (Asynchronous Transfer Mode), and be a frame relay line, a cable television line, a data broadcasting wireless line, or the like. The network 104 may be any communication network capable of transmitting and receiving data, which is realized by a combination of the above.

In the example shown in FIG. 1, the cloud platform 103 is located in a cloud. The term "cloud" refers to an area in which a server group in a cloud computing environment is located. In other words, the cloud platform 103 is a virtual server group located in the cloud. In the present embodiment, the cloud platform 103 functions as a management server that uploads and manages document files transmitted from the document production apparatus 102. While, in the example, a document production system processes a document file, data to be processed by the document production system is not limited to a document file. The document production system can process any document data.

The client apparatus 101 functions as a user device that is operated by a user. The client apparatus 101 is located in a network (e.g., local area network) where access from the cloud platform 103 is limited by a firewall. An access inside of the firewall cannot be made by a request provided from the cloud platform 103. Thus, the cloud platform 103 returns a response to the request from the client apparatus 101 to thereby perform a communication with the client apparatus 101. Instead of the cloud platform 103, any management server, which has the same function as that of the cloud platform 103, and has a limited access to a place where the client apparatus 101 is located, may also be applicable to the present embodiment.

The client apparatus 101 is, for example, a desktop personal computer, a laptop personal computer, a mobile personal computer, a PDA (Personal Data Assistant), or the like. The client apparatus 101 may be a mobile telephone having a built-in program execution environment. A program execution environment such as a Web browser (Internet browser) and the like is built in the client apparatus 101.

The client apparatus 101 makes a document production request to the document production apparatus 102 using a Web browser. The document production request is a request for the production of a document file, i.e., document data. Also, the client apparatus 101 makes an upload request or a download request of a document file, i.e., document data to the document production apparatus 102. The document file upload request is a request for the uploading of a document file to the cloud platform 103. The document file download request is a request for the downloading of a document file to the client apparatus 101. The client apparatus 101 may also make a download request of the document file, which has been uploaded to the cloud platform 103, to the cloud platform 103.

The document production apparatus 102 is the information processing apparatus of the present embodiment, and produces a document file in response to the request from the client apparatus 101. More specifically, the document production apparatus 102 receives a document production request from the Web browser of the client apparatus 101 and then produces document data (e.g., a document file such as PDF). PDF is the abbreviation for "Portable Document Format". Also, the document production apparatus 102 uploads the produced document file to the cloud platform 103, or downloads it to the client apparatus 101. According to one embodiment of the present invention, the document production apparatus 102 divides the produced document file into a plurality of divided data, i.e., divided files, and uploads the divided files to the cloud platform 103.

Figure 2:
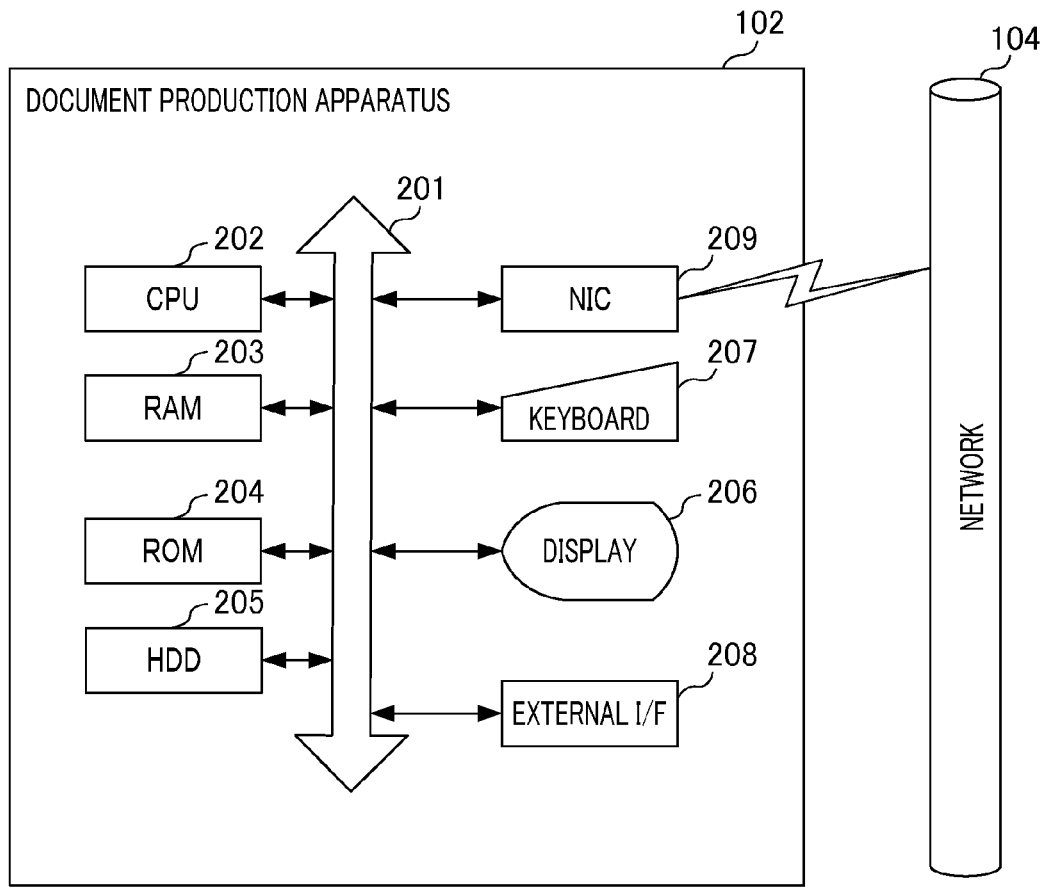
FIG. 2 is a diagram illustrating an exemplary hardware configuration of the document production apparatus.

FIG. 2 is a diagram illustrating an exemplary hardware configuration of the document production apparatus. The document production apparatus 102 includes a CPU (Central Processing Unit) 202, a RAM (Random Access Memory) 203, and a ROM (Read Only Memory) 204. The document production apparatus 102 further includes a HDD (Hard Disk Drive) 205, a display 206, a keyboard 207, an external I/F (Interface) 208, and an NIC (Network Interface Card) 209. These processing units are connected to each other via a system bus 201. The system bus is, for example, a PCI (Peripheral Component Interconnect) bus, an AGP (Accelerated Graphics Port) bus, a memory bus, or the like.

The CPU 202 controls the overall document production apparatus. The CPU 202 controls execution of an application program, an OS (Operating System), and the like that are stored in the HDD 205, and temporal storage of information, files, and the like that are necessary in executing programs in the RAM 203. The ROM 204 stores programs of a basic I/O program and the like in advance. The RAM 203 is a temporal storage unit, and functions as a main memory, a work area, and the like of the CPU 202. The HDD 205 is an external storage unit, and functions as a large-capacity memory. The HDD 205 stores a computer program that realizes the document data producing method of the present embodiment.

The display 206 displays a command input from the keyboard 207, a document produced by the document production system 102, and the like. The external device I/F 208 is an interface for establishing connections with an image forming apparatus, an USB device, and peripherals. The keyboard 207 is a tool through which operational information is input in response to a user operation. The NIC 209 performs data transmission and reception between external apparatuses such as the client apparatus 101, the cloud platform 103, and the like via the network 104. The hardware configuration of the document production apparatus 102 is not limited to an exemplary configuration shown in FIG. 2. Note that the hardware configuration of the client apparatus 101 is the same as that of the document production apparatus 102.

Figure 3:
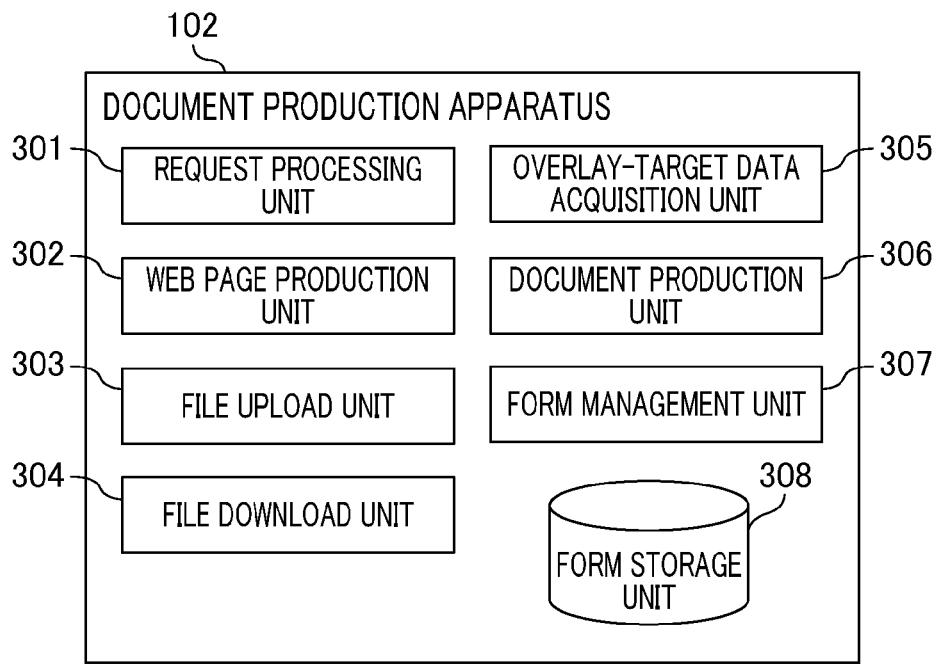
FIG. 3 is an exemplary functional block diagram illustrating the document production apparatus.

FIG. 3 is an exemplary functional block diagram illustrating the document production apparatus. The document production apparatus 102 includes a request processing unit 301, a Web page production unit 302, a file upload unit 303, a file download unit 304, an overlay-target data acquisition unit 305, a document production unit 306, a form management unit 307, and a form storage unit 308.

The request processing unit 301 receives a document production request, an upload request, or a download request from the client apparatus 101, and returns a response. Also, the request processing unit 301 receives the form information, which provides instruction about the form of a document to be produced, from the client apparatus 101. In other words, the request processing unit 301 functions as a request reception unit configured to receive a document data production request from a user device and an upload request for the produced document data to a management server or a download request for the document data to the user device. The Web page production unit 302 produces a Web page, and passes the produced Web page to the Web browser of the client apparatus 101 for display.

The file upload unit 303 functions as an uploading unit configured to upload a document file to the cloud platform 103 through the transmission of the document file to the cloud platform 103 via the network 104. More specifically, the file upload unit 303 determines whether or not the size of the produced document file exceeds a predetermined threshold value when the request processing unit 301 receives an upload request. The threshold value is, for example, the size of the file that can be uploaded to the cloud platform 103. The threshold value is determined in advance. The file upload unit 303 uploads the document file to the management server when the size of the document file is less than or equal to the threshold value. The file upload unit 303 provides a notification to prompt the client apparatus 101 to download the document file when the size of the document file exceeds the threshold value. According to one embodiment of the present invention, the file upload unit 303 divides the document file into a plurality of divided files and uploads the plurality of divided files to the cloud platform 103 when the size of the document file exceeds the threshold value.

The file download unit 304 downloads a document file to the client apparatus 101 through the transmission of the document file to the client apparatus 101 via the network 104. In other words, the file download unit 304 functions as a downloading unit configured to download the produced document file to the client apparatus 101 when the request processing unit 301 receives the download request.

When the request acquisition unit 301 acquires a document production request, the overlay-target data acquisition unit 305 acquires overlay-target data from the cloud platform 103 via the network 104 in response to the document production request. The overlay-target data is target data for overlay processing performed by the document production unit 306, i.e., the data that is overlayed on the form stored in the form storage unit 308. The overlay-target data acquisition unit 305 transmits information including a data acquisition command to the cloud platform 103 to thereby acquire overlay-target data from the cloud platform 103. The data acquisition command is a command that requests the transmission of overlay-target data. The data acquisition command has the format of, for example, a SQL (database query language) or the like. The overlay-target data acquisition unit 305 passes the acquired overlay-target data to the document production unit 306.

The document production unit 306 receives overlay-target data from the overlay-target data acquisition unit 305. Also, the document production unit 306 receives the form, which is specified by the form information acquired by the request acquisition unit 301, from the form management unit 307. When the document production unit 306 receives a document file production request from the client apparatus 101, the document production unit 306 overlays the received form and the overlay-target data that has been passed from the overlay-target data acquisition unit 305 to thereby produce a document file. In other words, the overlay-target data acquisition unit 305 and the document production unit 306 function as document production units configured to produce document data in response to a document data production request.

The form management unit 307 manages the document form that is stored in the form storage unit 308 in advance. The form management unit 307 extracts the form, which is specified by the form information received from the request processing unit, from the form storage unit 308 to thereby pass the form to the document production unit 306. The form storage unit 308 stores the document form in advance. The document data producing method of the present embodiment is realized by the functions of the processing units provided in the document production apparatus 102 shown in FIG. 3.

Figure 4:
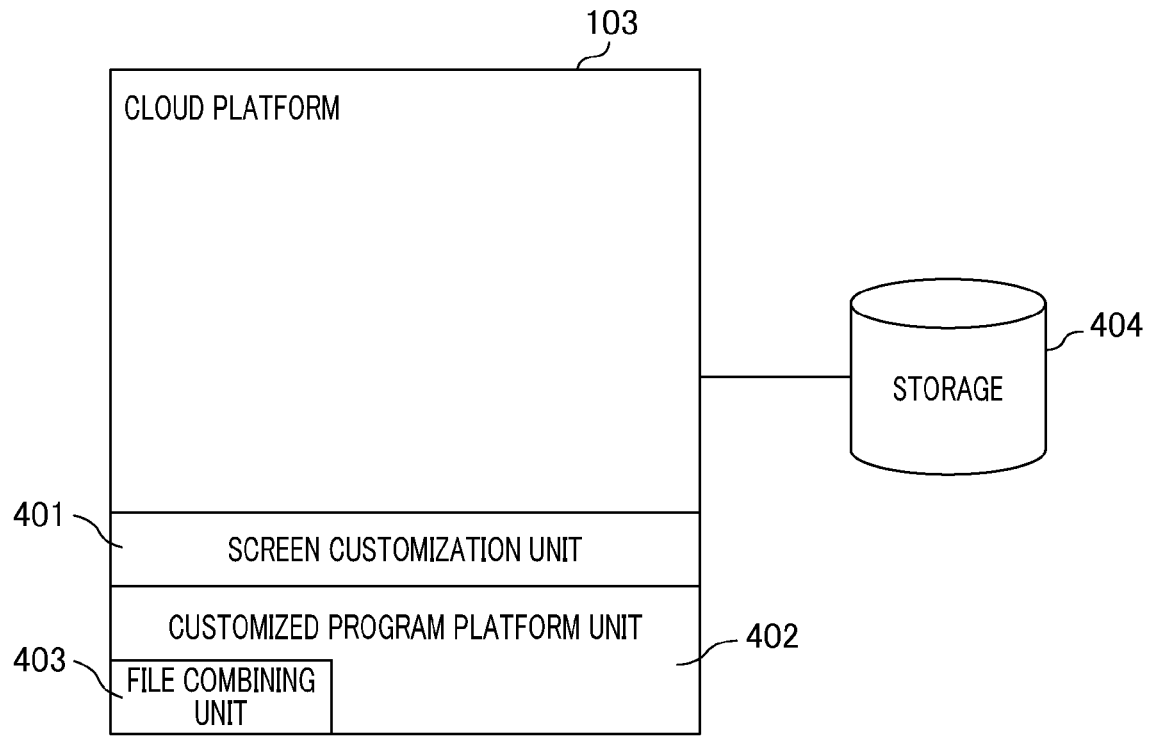
FIG. 4 is a diagram illustrating an exemplary configuration of a cloud platform.

FIG. 4 is a diagram illustrating an exemplary configuration of a cloud platform. The cloud platform 103 includes a storage 404 that serves as a storage unit. The cloud platform 103 uploads the document file transmitted from the document production apparatus 102, i.e., stores and manages the document file in the storage 404. Also, the cloud platform 103 manages overlay-target data that is stored in the storage 404 in advance.

The cloud platform 103 includes software modules such as a screen customization unit 401, a customized program platform unit 402, and a file combining unit 403. The screen customization unit 401 executes a customized program defined by the customized program platform unit 402 to thereby customize the screen to be displayed on the Web browser of the client apparatus 101. For example, the screen customization unit 401 customizes a list of document files uploaded by the cloud platform 103 and displays them on a work screen 701 (see FIG. 6) to be displayed on the Web browser of the client apparatus 101. Also, the screen customization unit 401 receives information including a data acquisition command from the overlay-target data acquisition unit 305 of the document production apparatus 102, and acquires overlay-target data from the storage 404 based on the received information. The screen customization unit 401 transmits the acquired overlay-target data to the overlay-target data acquisition unit 305 of the document production apparatus 102. A predetermined processing unit (not shown) other than the screen customization unit 401 provided in the cloud platform 103 may perform overlay-target data acquisition processing.

The customized program platform unit 402 defines a customized program, whereby the customized program can be operated. The file combining unit 403 is a software module that operates on the customized program platform unit 402, and combines the uploaded document files. For example, assume the case where the document production apparatus 102 uploads the divided files to the cloud platform 103. When a document file download request is made from the client apparatus 101 to the cloud platform 103, the file combining unit 403 acquires the divided files corresponding to the document file from the storage 404. Then, the file combining unit 403 combines the acquired divided files, and transmits them to the client apparatus 101.

Figures 5A, 5B:
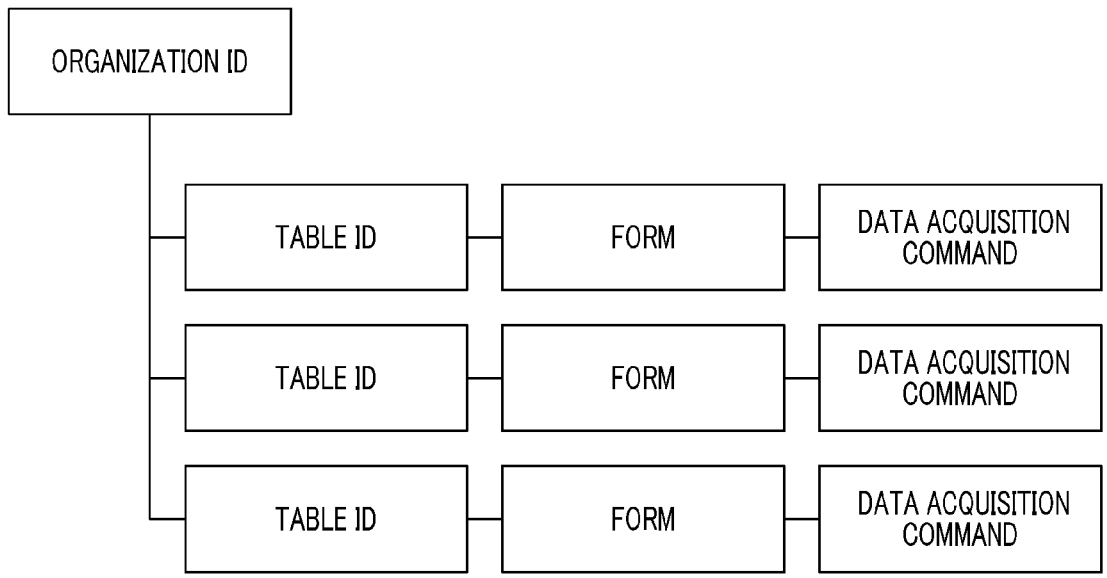
FIG. 5A is a diagram illustrating an exemplary data configuration of overlay-target data.
FIG. 5B is a diagram illustrating the association relationship between a data acquisition command and a document form.

FIGS. 5A and 5B are diagrams illustrating an exemplary data configuration of overlay-target data and illustrating the association relationship between a data acquisition command and a document form, respectively. FIG. 5A is a diagram illustrating an exemplary data configuration of overlay-target data. Overlay-target data is managed by an overlay-target data table 501. The overlay-target data table 501 has a table ID for uniquely identifying the overlay-target data table 501. The overlay-target data managed by the overlay-target data table 501 includes data items such as a data ID, a product name, quantity, price, and the like. The data ID is an identifier for uniquely identifying overlay-target data. The product name, quantity, price, and the like indicate the attribute items of overlay-target data.

FIG. 5B is a diagram illustrating the association relationship between a data acquisition command and a document form. An organization ID shown in FIG. 5B is an identifier for uniquely identifying the organization (e.g., company) to which the client apparatus 101 belongs. The document production apparatus 102 links a table ID, a form information, and a data acquisition command in advance for each organization ID and manages them as the linked information. The document production apparatus 102 receives an organization ID, a table ID, and form information from the client apparatus 101. Then, based on the organization ID, table ID, and form information that have been received, the document production apparatus 102 determines a data acquisition command using the linked information. The data ID and the attribute items of overlay-target data are set in the data acquisition command in advance. The document production apparatus 102 transmits the determined data acquisition command and the table ID to the cloud platform 103. The cloud platform 103 receives the data acquisition command and the table ID from the document production apparatus 102. The cloud platform 103 acquires the overlay-target data corresponding to the data ID and the attribute items, which are included in the data acquisition command, from the overlay-target data table 501 corresponding to the received table ID. Then, the cloud platform 103 transmits the acquired overlay-target data to the document production apparatus 102.

Figure 6:
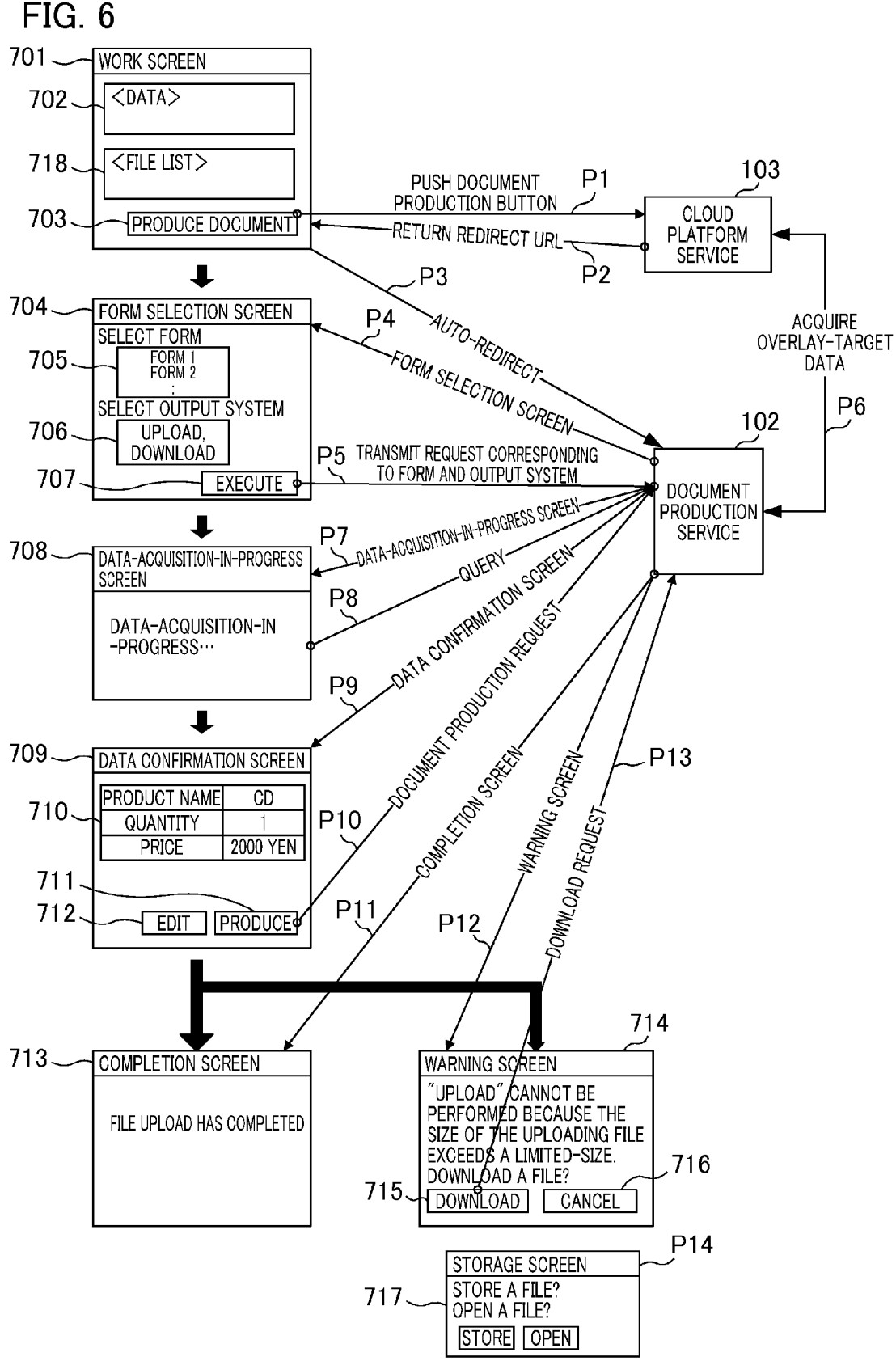
FIG. 6 is a diagram illustrating overall operation processing performed by a document production system of the present embodiment.

FIG. 6 is a diagram illustrating overall operation processing performed by a document production system of the present embodiment. The cloud platform 103 returns the work screen 701 to the Web browser of the client apparatus 101 operated by a user who has logged in the cloud platform 103. The overlay-target data, which is set in the overlay-target data table 501 managed by the cloud platform 103, is displayed on the data area 702 of the work screen 701. When a user selects overlay-target data on the data area 702, the client apparatus 101 specifies the table ID of the overlay-target data table. The document file, which has been uploaded to the cloud platform 103, is displayed on the file list area 718. A document production button 703 is a button that issues a document production request to the cloud platform 103. When a user pushes the document production button 703, the Web browser of the client apparatus 101 transmits a document production request to the cloud platform 103 (see P1 in FIG. 6).

When the cloud platform 103 receives the document production request, the cloud platform 103 returns the redirect URL, i.e., the URL for redirecting to the document production apparatus 102, to the client apparatus 101 (see P2 in FIG. 6). When the Web browser of the client apparatus 101 receives the redirect URL, the Web browser redirects (auto-redirects) to the document production apparatus 102 corresponding to the redirect URL (see P3 in FIG. 6). Information, which is passed to the document production apparatus 102 through redirect, includes the document production request, the connection information to the cloud platform 103, the table ID specified by the client apparatus 101, and the organization ID of the client apparatus 101.

The document production apparatus 102, which has received the redirect, returns a form selection screen 704 to the Web browser of the client apparatus 101 (see P4 in FIG. 6). The form selection screen 704 includes a form selection column 705, an output system selection column 706, and an execution button 707. The form of the selection candidate document is displayed on the form selection column 705. The candidate of the output system of a document file to be produced is displayed on the output system selection column 706. In the example, upload and download are displayed on the output system selection column 706. When a user selects a form on the form selection column 705, selects its output system on the output system selection column 706, and pushes the execution button 707, the Web browser executes the following processing. The Web browser transmits the request corresponding to the selected output system to the document production apparatus 102. When the selected output system is "upload", the Web browser transmits a document file upload request to the document production apparatus 102. In contrast, when the selected output system is "download", the Web browser transmits a document file download request to the document production apparatus 102. In addition, the Web browser transmits the selected form to the document production apparatus 102 (see P5 in FIG. 6). In other words, the Web browser transmits form information, which specifies the selected form, to the document production apparatus 102.

The request processing unit 301 provided in the document production apparatus 102 receives form information from the Web browser. Next, based on the received form information, the table ID that has been passed through redirect in P3 described above, and the organization ID, the overlay-target data acquisition unit 305 provided in the document production apparatus 102 determines a data acquisition command using the linked information. Then, the overlay-target data acquisition unit 305 transmits the data acquisition command and the table ID to the cloud platform 103 to thereby acquire overlay-target data from the cloud platform 103 (see P6 in FIG. 6). During acquisition of overlay-target data, the document production apparatus 102 causes the Web browser of the client apparatus 101 to display a data-acquisition-in-progress screen 708 (see P7 in FIG. 6). In the example, the Web browser of the client apparatus 101 periodically queries the document production apparatus 102 about whether or not overlay-target data acquisition is completed (see P8 in FIG. 6). When overlay-target data acquisition is incomplete, the document production apparatus 102 (the Web page production unit 302 therein) returns the data-acquisition-in-progress screen 708 to the Web browser of the client terminal 101.

When the document production apparatus 102 completes overlay-target data acquisition, the document production apparatus 102 causes the Web browser of the client apparatus 101 to display a data confirmation screen 709 (see P9 in FIG. 6). The data confirmation screen 709 has a data confirmation table 710, a production button 711, and an edit button 712. The overlay-target data acquired by the document production apparatus 102 is set in the data confirmation table 710. The production button 711 is a button that provides instructions about document production. When a user pushes the production button 711, the Web browser transmits a document production request to the document production apparatus 102 (see P10 in FIG. 6). The edit button 712 is a button that edits the overlay-target data set in the data confirmation table 710. When a user pushes the edit button 712, the Web browser displays an edit screen for editing the data confirmation table 710.

Here, it is assumed that the upload has been selected as the output system on the form selection screen 704, and the Web browser of the client apparatus 101 has transmitted a document file upload request to the document production apparatus 102. The document production apparatus 102 produces a document file in accordance with the document production request that has been transmitted in P10. More specifically, the document production unit 306 provided in the document production apparatus 102 overlays the overlay-target data set in the data confirmation table 710 of the data confirmation screen 709 and the form specified by the form information that has been transmitted in P5 to thereby produce a document file. The file upload unit 303 provided in the document production apparatus 102 determines whether or not the size of the produced document file exceeds a predetermined threshold value. The threshold value indicates the size of a file that can be uploaded by the cloud platform 103. When the size of the document file does not exceed the threshold value, the file upload unit 303 provided in the document production apparatus 102 uploads the document file to the cloud platform 103. Then, the Web page production unit 302 causes the Web browser of the client apparatus 101 to display a completion screen 713 indicating that the upload has been completed (see P11 in FIG. 6).

When the size of the document file exceeds the threshold value, the Web page production unit 302 provided in the document production apparatus 102 causes the Web browser of the client apparatus 101 to display a warning screen 714 (see P12 in FIG. 6). In other words, the document production apparatus 102 provides a notification to prompt the client apparatus 101 to download the document file. When a user pushes a cancel button 716 on the warning screen 714, the Web browser of the client apparatus 101 closes the warning screen 714. When a user pushes a download button 715 on the warning screen 714, the client apparatus 101 makes a download request to the document production apparatus 102. When the request processing unit 301 provided in the document production apparatus 102 receives the download request, the file download unit 304 transmits the document file to the client apparatus 101. With this arrangement, the document file is downloaded to the client apparatus 101. In the example, when the Web browser of the client apparatus 101 receives the document file from the document production apparatus 102, the Web browser displays a storage screen 717 (see P14 in FIG. 6). When a user pushes a storage button displayed on the storage screen 717, the client apparatus 101 stores the document file in a predetermined storage unit.

Note that when the download has been selected as the output system on the form selection screen 704 and the Web browser of the client apparatus 101 has transmitted a document file download request to the document production apparatus 102, the document production apparatus 102 performs the following processing. The document production unit 306 provided in the document production apparatus 102 produces a document file in accordance with the document production request that has been transmitted in P10. Then, the file download unit 304 provided in the document production apparatus 102 transmits the produced document file to the client apparatus 101 for downloading.

Figure 7:
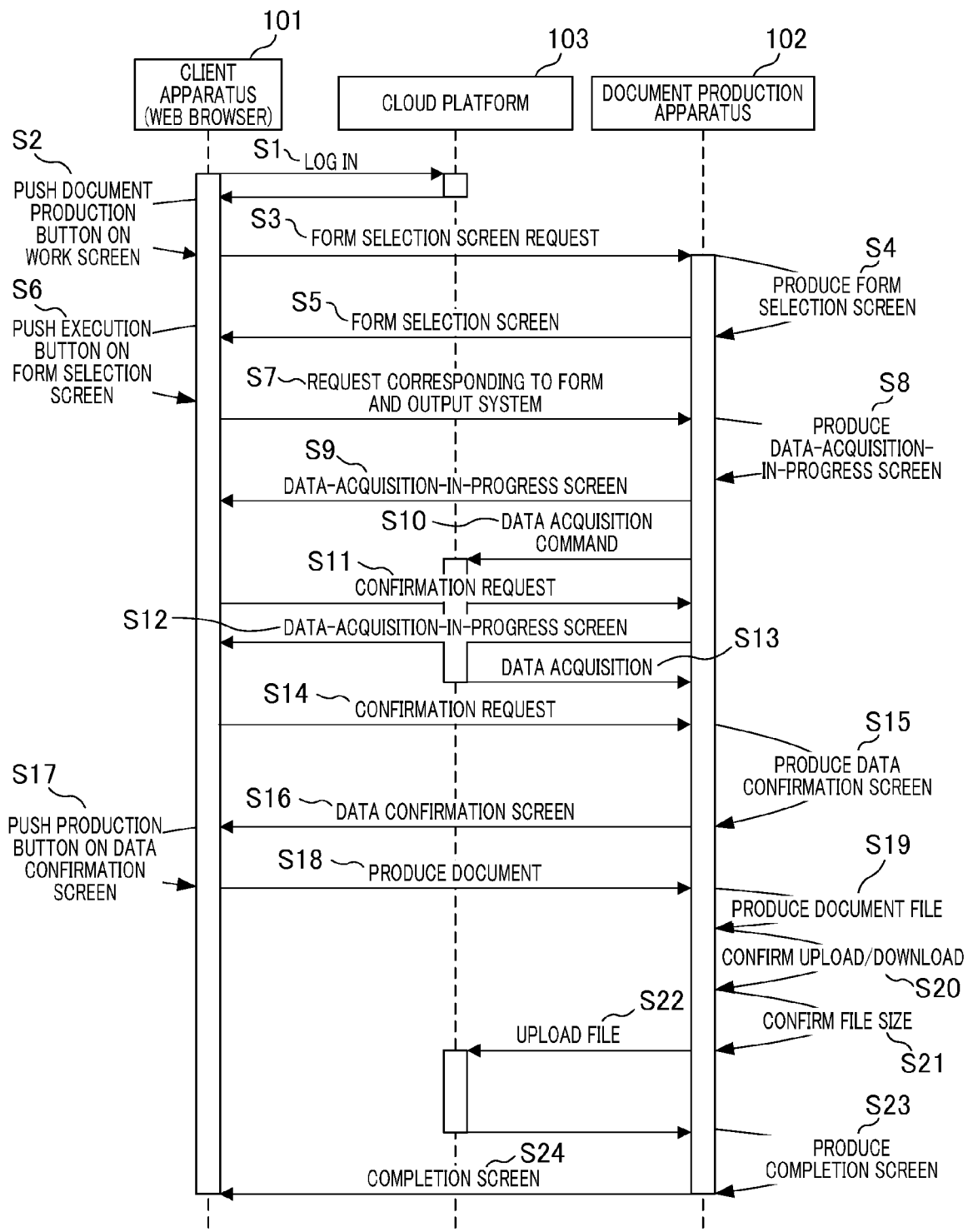
FIG. 7 is a diagram illustrating the production processing sequence of a document file.
Figure 8:
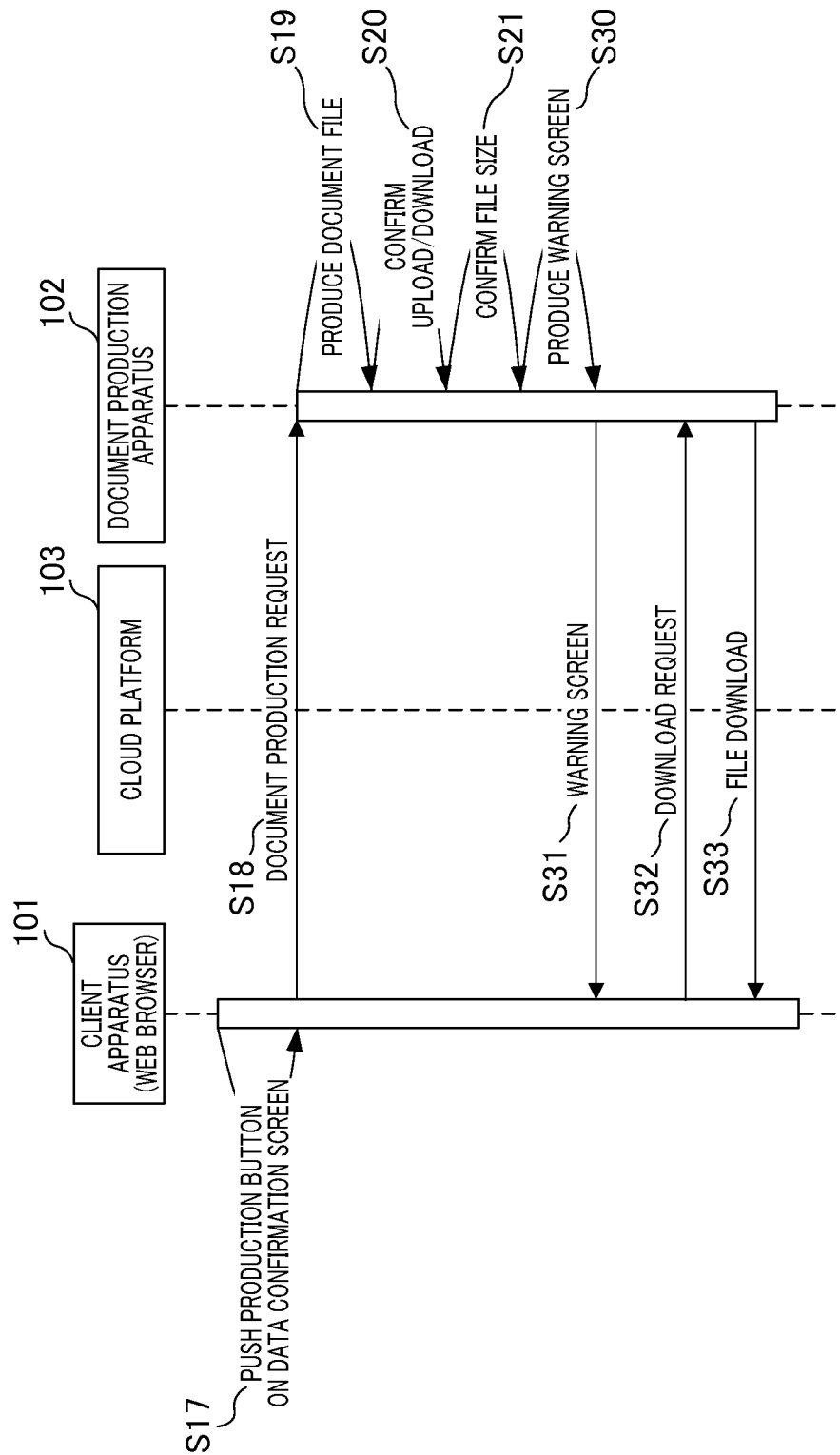
FIG. 8 is a diagram illustrating the production processing sequence of a document file.

FIGS. 7 and 8 are diagrams illustrating the production processing sequence of a document file according to the first embodiment of the present invention. FIG. 7 is a diagram illustrating the production processing sequence of a document file when the produced document file does not exceed a threshold value. First, the client apparatus 101 (the Web browser thereof) logs in the cloud platform 103 (step S1). When a user pushes the document production button 703 on the work screen 701 (step S2), the client apparatus 101 sends a form selection screen request to the document production apparatus 102 (step S3). The form selection screen request is a request for the production of the form selection screen 704. Next, the Web page production unit 302 provided in the document production apparatus 102 produces the form selection screen 704 in response to the form selection screen request to cause the Web browser of the client apparatus 101 to display the form selection screen 704 (step S5).

Next, a user selects the form and the output system of the document file on the form selection screen 704, and pushes the execution button 707 (step S6). The client terminal 101 transmits the request (upload request or download request) corresponding to the output system of the document file and the form information to the document production apparatus 102 (step S7). The document production apparatus 102 produces the data-acquisition-in-progress screen 708 (step S8), and causes the client apparatus 101 to display the produced data-acquisition-in-progress screen (step S9). Next, the document production apparatus 102 transmits a data acquisition command to the cloud platform 103 (step S10). The client apparatus 101 periodically transmits a confirmation request to the document production apparatus 102 and confirms whether or not overlay-target data acquisition has completed (step S11). The document production apparatus 102 causes the client apparatus 101 to display the data-acquisition-in-progress screen 708 until overlay-target data acquisition has completed. Next, the document production apparatus 102 completes overlay-target data acquisition (step S13). When the document production apparatus 102 completes overlay-target data acquisition, the document production apparatus 102 stores and manages session information. The session information is information including the request corresponding to the form information and the output system that have been received from the client apparatus 101 in step S7, and the overlay-target data that has been acquired in step S13.

When the document production apparatus 102 receives a confirmation request from the client apparatus 101, the document production apparatus 102 produces the data confirmation screen 709 (step S15). Then, the document production apparatus 102 causes the client apparatus 101 to display the produced data confirmation screen 709 (step S16).

Next, when a user pushes the production button 711 on the data confirmation screen 709 (step S17), the client apparatus 101 transmits a document production request to the document production apparatus 102 (step S18). The document production apparatus 102 receives the document production request to thereby produce a document file (step S19). Next, the document production apparatus 102 confirms whether or not either one of an upload request or a download request has been received from the client apparatus 101 in step S7 (step S20). In the example, it is assumed that the document production apparatus 102 has received the upload request from the client apparatus 101. The document production apparatus 102 determines whether or not the file size of the produced document file exceeds a threshold value (step S21). In the example, the document production apparatus 102 determines that the file size of the produced document file does not exceed a threshold value. Thus, the document production apparatus 102 transmits the document file to the cloud platform 103 for uploading (step S22). Next, the document production apparatus 102 produces the completion screen 713 (step S23). Then, the document production apparatus 102 causes the client apparatus 101 to display the produced completion screen 713 (step S24).

FIG. 8 is a diagram illustrating the production processing sequence of a document file when the document file produced by the document production apparatus 102 exceeds a threshold value. Steps S17 to S21 shown in FIG. 8 are the same as steps S17 to S21 shown in FIG. 7. In the example shown in FIG. 8, the document production apparatus 102 confirms the file size of the document file, and determines that the file size exceeds a threshold value (step S21). Hence, the document production apparatus 102 produces the warning screen 714 (step S30), and displays it on the client apparatus 101 (step S31). When a user pushes a download button 715 on the warning screen 714, the client apparatus 101 transmits a download request to the document production apparatus 102 (step S32). When the document production apparatus 102 receives the download request from the client apparatus 101, the document production apparatus 102 transmits the document file to the client apparatus 101 for downloading (step S33).

Figure 9:
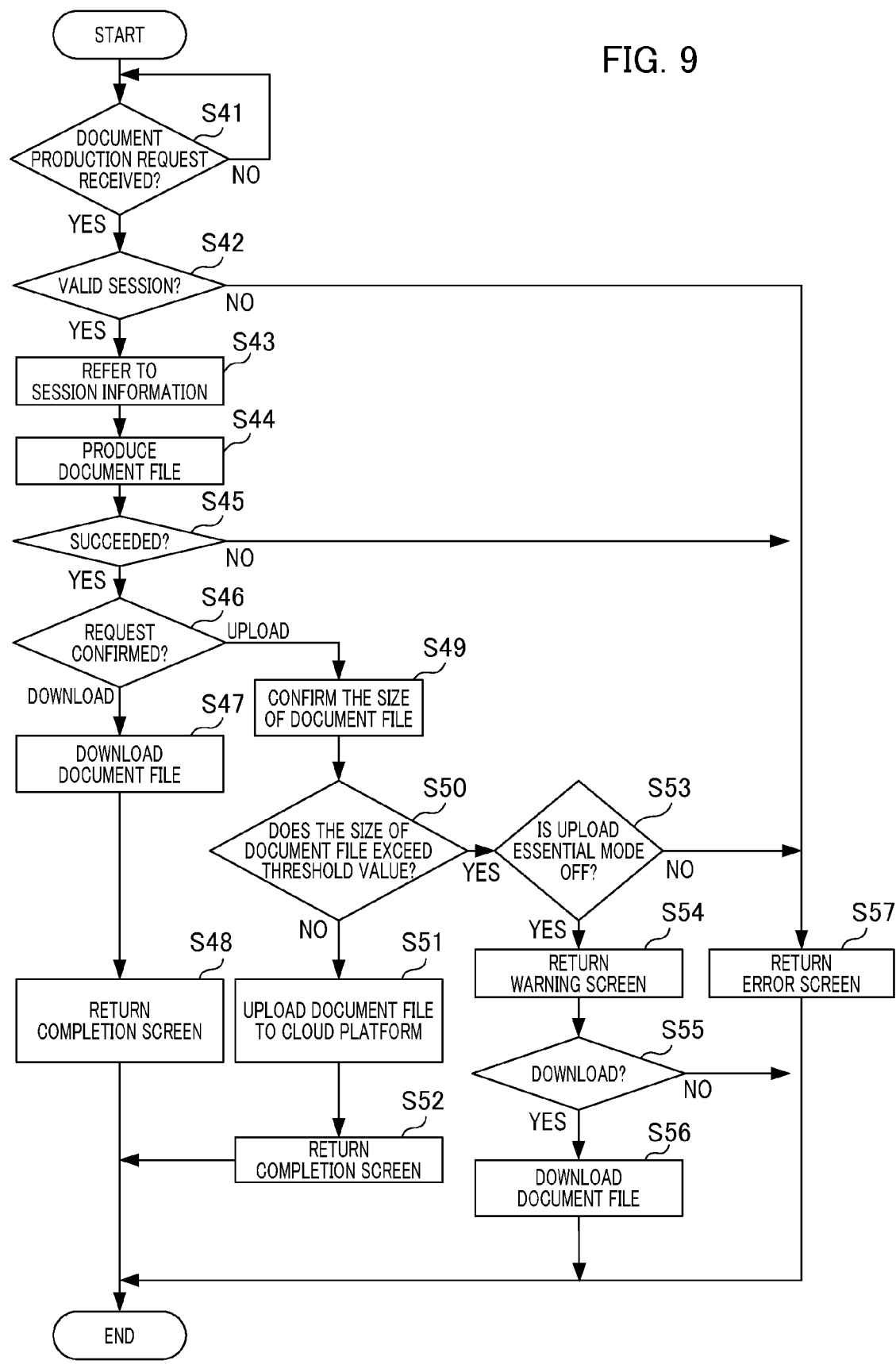
FIG. 9 is a diagram illustrating the operation processing flow of the document production apparatus of a first embodiment.

FIG. 9 is a diagram illustrating the operation processing flow of the document production apparatus of the first embodiment. First, the request processing unit 301 provided in the document production apparatus 102 determines whether or not a document production request has been received from the Web browser of the client apparatus 101 (step S41). When the request processing unit 301 determines that the document production request has not been received, the process returns to step S41. When the request processing unit 301 determines that the document production request has been received, the request processing unit 301 determines whether or not a session between the request processing unit 301 and the client apparatus 101 is valid (step S42).

When a session between the request processing unit 301 and the client apparatus 101 is valid, the process advances to step S43. In contrast, when a session between the request processing unit 301 and the client apparatus 101 is invalid, the Web page production unit 302 produces an error screen, returns it to the Web browser of the client apparatus 101 (step S57), and ends the process.

In step S43, the overlay-target data acquisition unit 305 provided in the document production apparatus 102 refers to session information to thereby confirm form information and overlay-target data (step S43). Next, the document production unit 306 overlays the form specified by the form information confirmed in step S43 and the overlay-target data to thereby produce a document file (step S44). Next, the document production unit 306 determines whether or not the document file has been successfully produced (step S45). When the document file has not been successfully produced, the process advances to step S57. When the document file has been successfully produced, the file upload unit 303 confirms a request in accordance with the output system included in session information, and determines whether or not a request in accordance with the output system is a document file upload request (step S46). When a request in accordance with the output system is a document file download request, the process advances to step S47. Then, the file download unit 304 downloads the document file to the client apparatus 101 through the transmission of the document file to the Web browser of the client apparatus 101 (step S47). Next, the Web page production unit 302 provided in the document production apparatus 102 returns a completion screen indicating that the download of the document file has been completed to the Web browser of the client apparatus 101 (step S48).

When a request in accordance with the output system is a document file upload request, the file upload unit 303 confirms the size of the document file (step S49). Next, the file upload unit 303 determines whether or not the size of the confirmed document file exceeds a threshold value, i.e., the size of the file that can be uploaded to the cloud platform 103 (step S50). When the size of the document file does not exceed a threshold value, the file upload unit 303 uploads the document file to the cloud platform 103 (step S52), and returns the completion screen 713 to the client apparatus 101.

When the size of the document file exceeds a threshold value, the file upload unit 303 determines whether or not an upload essential mode is OFF (step S53). The upload essential mode is a processing mode indicating whether or not the upload of the document file is essential. In the example, it is assumed that the client apparatus 101 sets ON or OFF for the upload essential mode in advance in the document production apparatus 102 in response to a user's operation input. When the upload essential mode is ON, the upload of the document file is essential. When the upload essential mode is OFF, the upload of the document file is not essential.

When the upload essential mode is ON, the process advances to step S57. In contrast, when the upload essential mode is OFF, the Web page production unit 302 returns the warning screen 714 to the Web browser of the client apparatus 101 in accordance with the instruction provided by the file upload unit 303 (step S54). The warning screen 714 is a screen that provides a notification to prompt the client apparatus 101 to download a document file. When a user pushes the download button 715 of the warning screen 714, a document file download request is transmitted from the client apparatus 101 to the request processing unit 301 provided in the document production apparatus 102.

Figure 10:
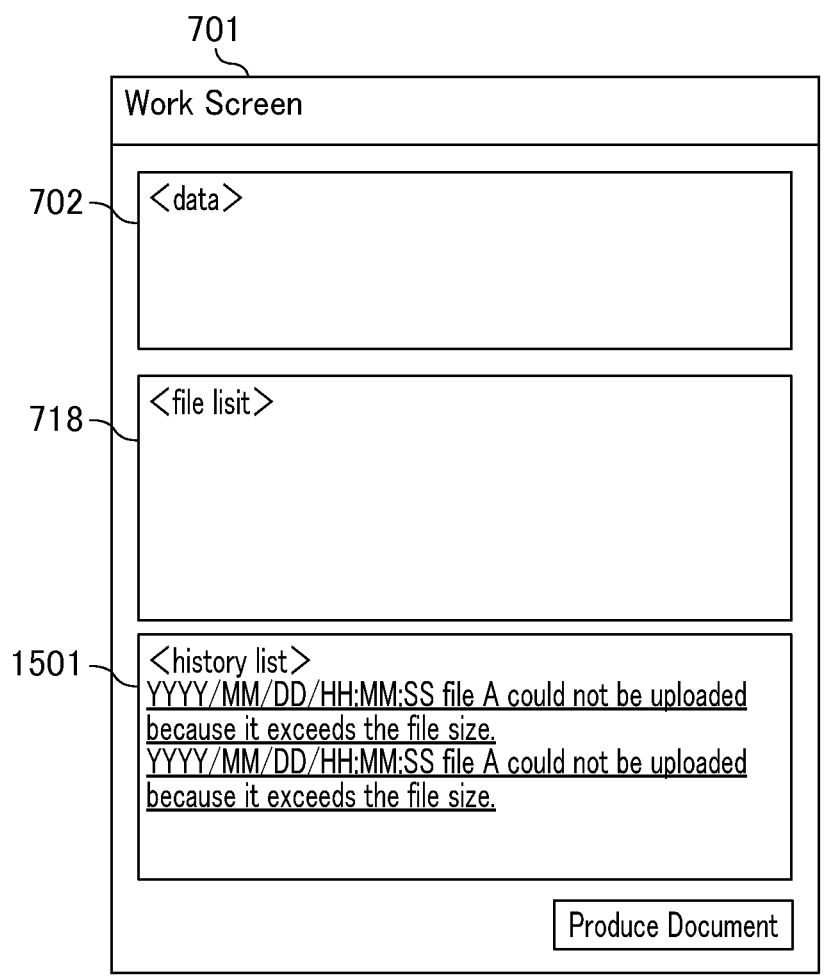
FIG. 10 is an exemplary illustration of history information about document file upload processing.

In step S54 described above, the file upload unit 303 provided in the document production apparatus 102 may further provide an instruction to the cloud platform 103 to thereby cause it to display the history information about document file upload processing on the work screen 701. For example, a record of when a user has logged into the cloud platform 103 and information indicating that the document file having a file name "file A" could not be uploaded are displayed as history information on a history list 1501 on the work screen 701 shown in FIG. 10.

Referring back to FIG. 9, the file download unit 304 determines whether or not the document file is downloaded to the client apparatus 101 (step S55). When the request processing unit 301 receives a download request in accordance with the push of the download button 715 of the warning screen 714 from the client apparatus 101, the file download unit 304 determines that the document file is downloaded to the client apparatus 101. Then, the process advances to step S56. When the request processing unit 301 does not receive a download request in accordance with the push of the download button 715 of the warning screen 714, the file download unit 304 determines that the document file is not downloaded to the client apparatus 101, and the process is ended. In step S56, the file download unit 304 downloads the document file to the client apparatus 101 (step S56), and the process is ended. When the document production apparatus 102 of the first embodiment receives an upload request for uploading a document file to the cloud platform 103 from the client apparatus 101, the document production apparatus 102 executes the following processing. When the size of the document file exceeds a size that can be uploaded to the cloud platform 103, the document production apparatus 102 enables the client apparatus 101 to download the document file. Therefore, according to the document production apparatus 102 of the first embodiment, the produced document file can be provided to the client apparatus 101 without wasting the file.

Next, a description will be given of a second embodiment of the present invention. When the document production apparatus 102 of the second embodiment receives a document file upload request from the client apparatus 101 and the size of the document file exceeds a threshold value, the document production apparatus 102 divides the document file into a plurality of divided files, i.e., divided data, for uploading.

Figure 11A:
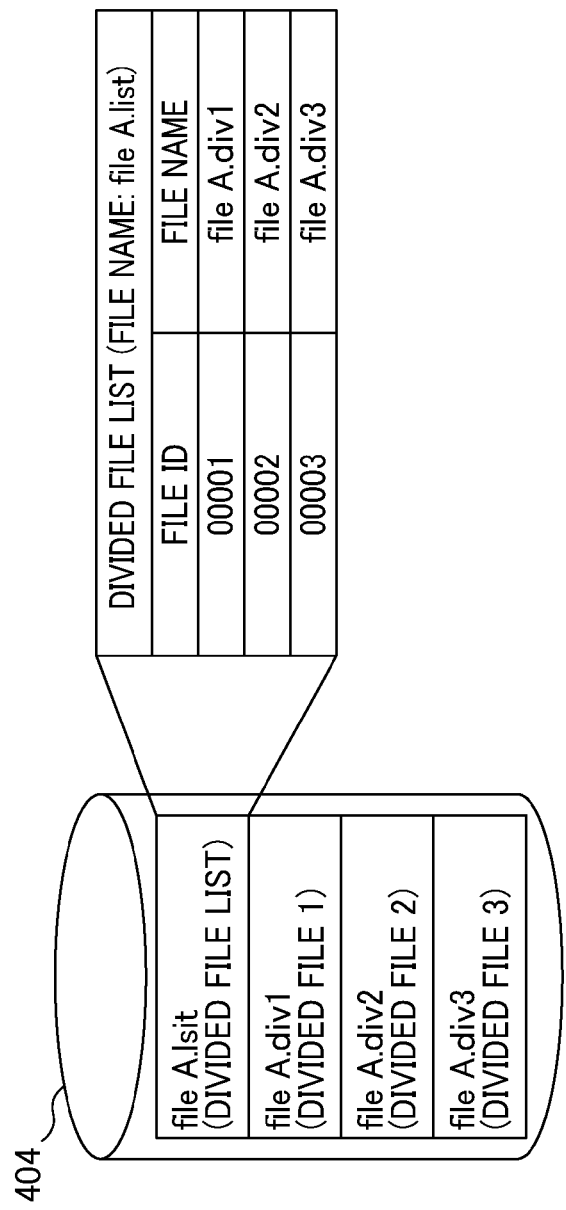
FIGS. 11A and 11B are diagrams illustrating an example of the management of divided files.
Figure 11B:
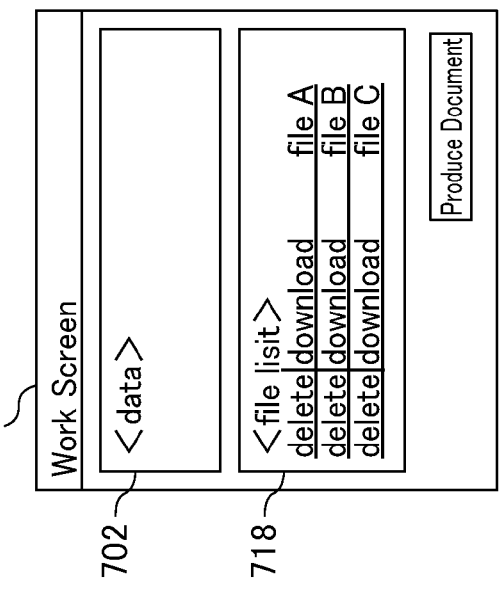

FIGS. 11A and 11B are diagrams illustrating an example of the management of divided files. As shown in FIG. 11A, the cloud platform 103 stores a divided file list and divided files in the storage 404 for management. The divided file list is the uploaded divided data, i.e., the list information about the divided files, and is used for combining the divided files. In the example, the divided file list is the file having a file name "file A.list". The divided file list has data items such as a file ID and a file name. The file ID is an ID for uniquely identifying the divided files in the divided file list. Also, the file ID defines the order of combining the divided files. The file name is the file name of the divided files. In other words, in the example, the file A indicates the file name of a coupled file, when three files, i.e., the file A.div1 to the file A.div3, are coupled to a single coupled file.

When the cloud platform 103 uploads the divided file list and the divided files (stores them in the storage 404), the cloud platform 103 produces the work screen 701 shown in FIG. 11B and cause the client apparatus 101 to display the work screen 701. The cloud platform 103 displays the file name corresponding to the document file, which is stored in the storage 404, on the file list area 718 of the work screen 701. More specifically, the cloud platform 103 displays the file name of the file obtained by combining the divided files into a single file, and the file name of the document file that has been transmitted from the document production apparatus 102 without being subjected to division and stored in the storage 404. When a user selects an area labeled "download", which corresponds to the file name displayed on the file list area 718, the file combining unit 403 provided in the cloud platform 103 executes the following processing. In the example, it is assumed the case where a user selects an area labeled "download", which corresponds to the file name of the file obtained by combining the divided files. The file combining unit 403 extracts the divided file list and the divided files, which correspond to the file name, from the storage 404. Then, the file combining unit 403 combines the extracted divided files in accordance with the order defined by the file ID on the divided file list, produces a single document file, and downloads it to the client apparatus 101.

Figure 12:
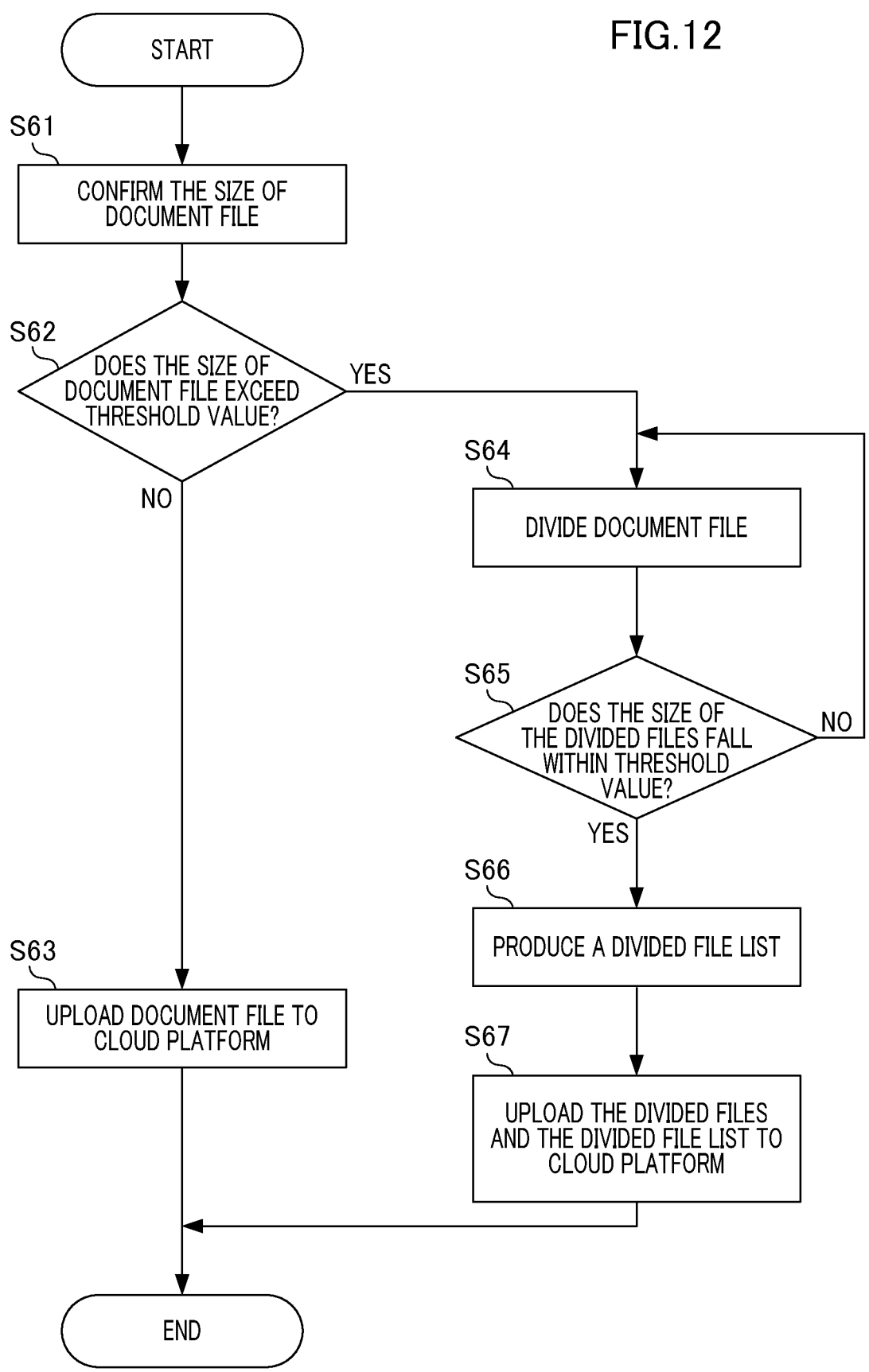
FIG. 12 is a diagram illustrating an example of the operation processing performed by the document production apparatus of a second embodiment.
Figure 13:
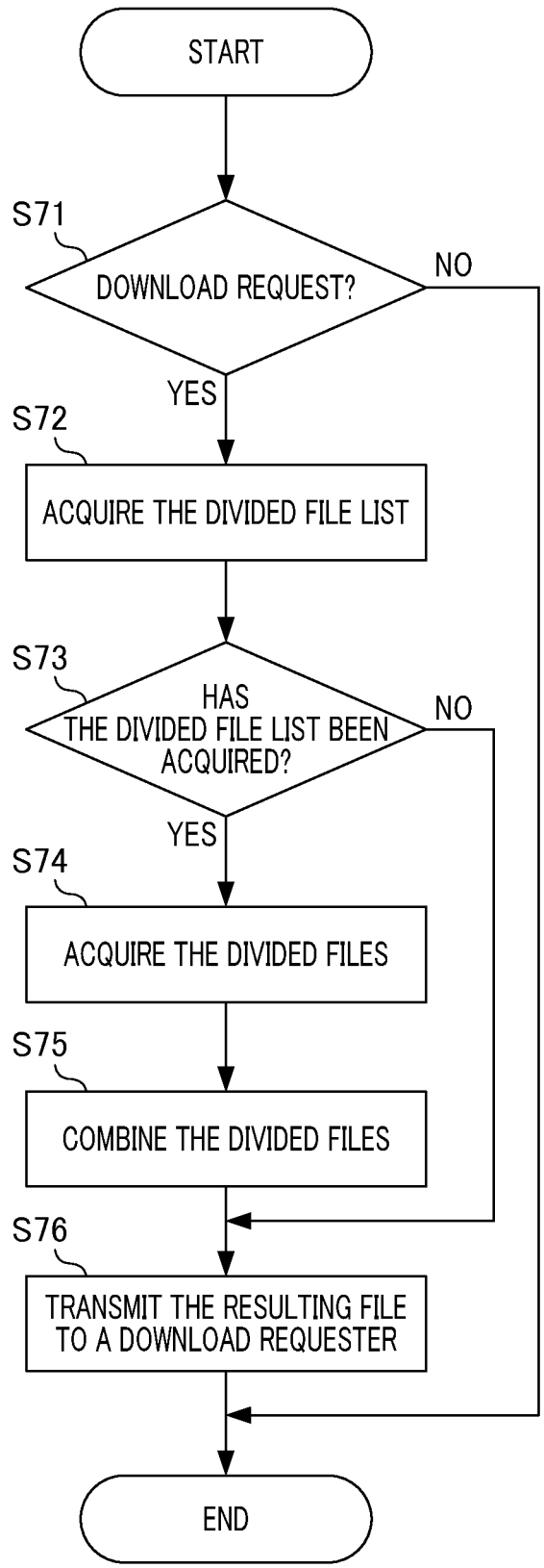
FIG. 13 is a diagram illustrating the download processing flow of a document file from a cloud platform.

FIG. 12 is a flowchart illustrating an example of the operation processing performed by the document production apparatus of a second embodiment. Of the operation processing performed by the document production apparatus 102 of the second embodiment, FIG. 13 shows processing which is different from operation processing performed by the document production apparatus 102 of the first embodiment described with reference to FIG. 9. In other words, the document production apparatus 102 of the second embodiment executes processing corresponding to steps S61 to S67 shown in FIG. 12 instead of processing corresponding to steps S49 to S56 shown in FIG. 9. Therefore, operation processing shown in FIG. 12 is operation processing performed when the document production apparatus 102 receives a document file upload request from the client apparatus 101.

First, the file upload unit 303 confirms the size of the document file (step S61). Next, the file upload unit 303 determines whether or not the size of the confirmed document file exceeds a threshold value, i.e., the size of the file that can be uploaded to the cloud platform 103 (step S62). When the size of the document file does not exceed a threshold value, the file upload unit 303 uploads the document file to the cloud platform 103 (step S63).

When the size of the document file exceeds a threshold value, the file upload unit 303 divides the document file into a plurality of divided files (step S64). The number of files into which the document file is divided (division number) is determined in advance. Next, the file upload unit 303 determines whether or not the size of the divided files falls within a threshold value (step S65). When the size of the divided files exceeds a threshold value, the process returns to step S64. The file upload unit 303 changes the division number to divide the document file again.

When the size of the divided files does not exceed a threshold value, the file upload unit 303 produces a divided file list corresponding to the divided files (step S66). Then, the file upload unit 303 uploads the divided files and the divided file list to the cloud platform 103 (step S67). In other words, when the file upload unit 303 uploads the divided files to the cloud platform 103, the file upload unit 303 transmits the list information about the divided files, which is used for combining the divided files, to the management server.

FIG. 13 is a diagram illustrating the download processing flow of a document file from a cloud platform according to the second embodiment. When a user selects the file name displayed on the file list area 718 of the work screen 701 shown in FIG. 11B, a document file to be downloaded is specified. Also, when a user selects the area labeled "download", which corresponds to the selected file name, the client apparatus 101 performs the following processing. The client apparatus 101 makes a download request for a document file to be downloaded to the cloud platform 103.

The cloud platform 103 determines whether or not the download request for a document file to be downloaded has been received (step S71). When the cloud platform 103 determines that the download request for a document file to be downloaded has not been received, the process is ended. In contrast, when the cloud platform 103 determines that the download request for a document file to be downloaded has been received, the process advances to step S72.

Next, the file combining unit 403 provided in the cloud platform 103 acquires a divided file list corresponding to a document file to be downloaded from the storage 404 (step S72). Next, the file combining unit 403 determines whether or not the divided file list was successfully acquired (step S73). When the file combining unit 403 determines that the divided file list cannot be acquired, the file combining unit 403 performs the following processing. The fact that the file combining unit 403 cannot acquire the divided file list means that a document file to be downloaded is a document file transmitted from the document production apparatus 102 without being subjected to division. Hence, in this case, the file combining unit 403 acquires a document file to be downloaded from the storage 404, and transmits the acquired document file to the download requester (step S76). In contrast, when the file combining unit 403 determines that the divided file list was successfully acquired, the file combining unit 403 acquires the divided files corresponding to the file names in the divided file list from the storage 404 (step S74). The file combining unit 403 combines the divided files in accordance with the order defined by the file ID on the divided file list (step S75). With this arrangement, a single coupled document file is thereby produced. Then, the file combining unit 403 transmits the produced document file to the download requester (step S76).

In other words, when the cloud platform 103 receives a download request for the divided files from the client apparatus 101, the cloud platform 103 combines the divided files using the divided file list that has been transmitted from the file upload unit 303 provided in the document production apparatus 102. Then, the cloud platform 103 downloads the coupled divided files to the client apparatus 101.

When the document production apparatus 102 of the second embodiment receives a document file upload request and the size of the document file exceeds the size of the file that can be uploaded to the cloud platform 103, the document production apparatus 102 performs the following processing. The document production apparatus 102 divides the document file into divided files and uploads them to the cloud platform 103. Also, the cloud platform 103 combines the uploaded divided files and downloads the coupled file to the client apparatus 101 in response to the document file download request from the client apparatus 101. Therefore, according to the second embodiment, even when the size of the document file exceeds a size that can be uploaded to the cloud platform 103, the produced document file can be divided into divided document files to upload them to the management server as well as the divided document files can be coupled to provide the coupled file to a user device.

Next, a description will be given of a third embodiment of the present invention. When the document production apparatus 102 of the third embodiment receives a document file upload request from the client apparatus 101 and the size of the document file exceeds a threshold value, the document production apparatus 102 compresses the document file to thereby upload the compressed document file to the cloud platform 103.

Figure 14:
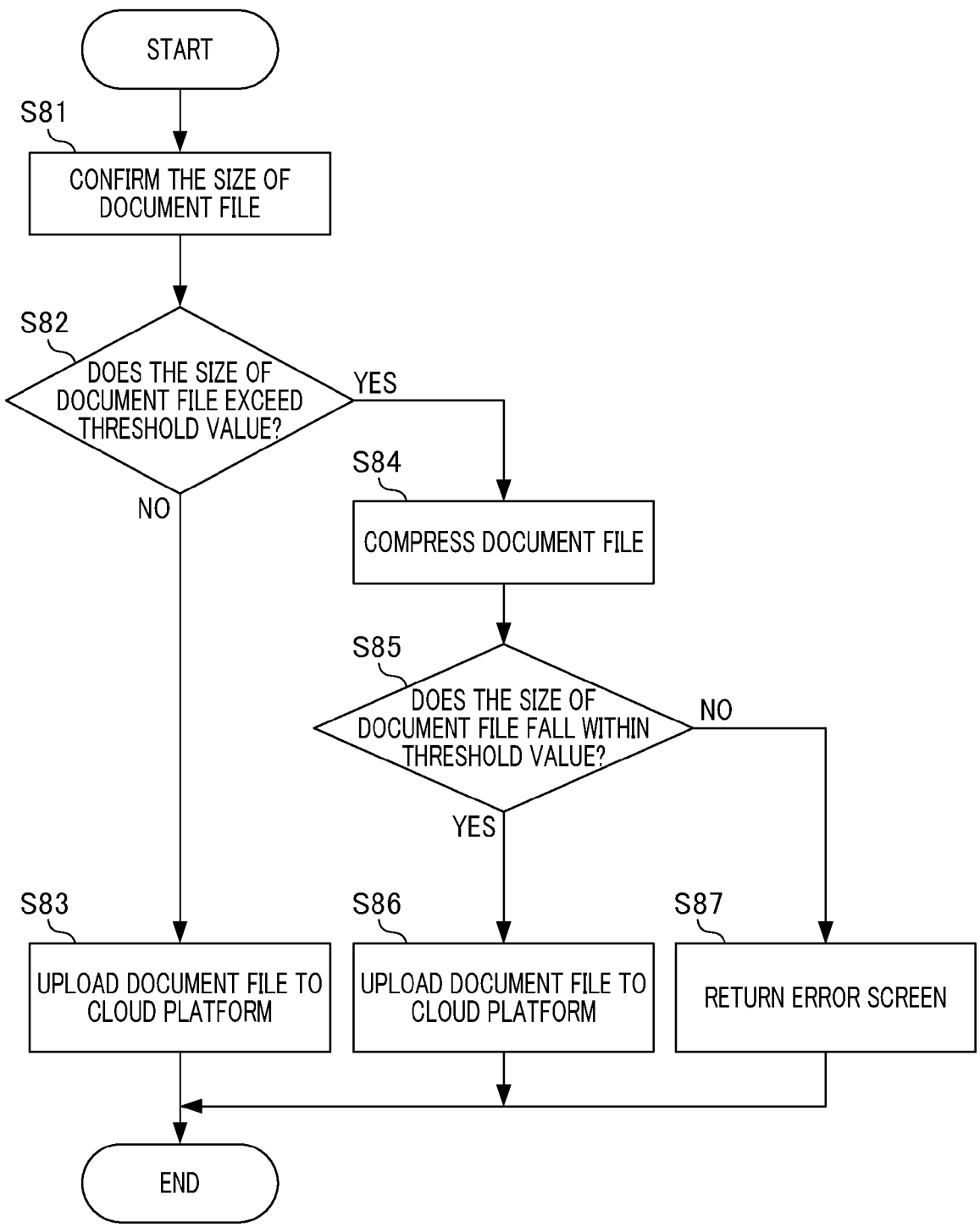
FIG. 14 is a diagram illustrating an example of the operation processing performed by the document production apparatus of a third embodiment.

FIG. 14 is a flowchart illustrating an example of the operation processing performed by the document production apparatus of a third embodiment. Of the operation processing performed by the document production apparatus 102 of the third embodiment, FIG. 13 shows processing which is different from operation processing performed by the document production apparatus 102 of the first embodiment described with reference to FIG. 9. In other words, the document production apparatus 102 of the third embodiment executes processing corresponding to steps S81 to S87 shown in FIG. 14 instead of processing corresponding to steps S49 to S56 shown in FIG. 9.

First, the file upload unit 303 confirms the size of the document file (step S81). Next, the file upload unit 303 determines whether or not the size of the confirmed document file exceeds a threshold value, i.e., the size of the file that can be uploaded to the cloud platform 103 (step S82). When the size of the document file does not exceed a threshold value, the file upload unit 303 uploads the document file to the cloud platform 103 (step S83).

When the size of the document file exceeds a threshold value, the file upload unit 303 compresses the document file into a predetermined file size (step S84). Next, the file upload unit 303 determines whether or not the size of the compressed document file falls within a threshold value (step S85). When the size of the compressed document file exceeds a threshold value, the Web page production unit 302 produces an error screen, and returns it to the Web browser of the client apparatus 101 (step S87). When the size of the compressed document file falls within a threshold value, the file upload unit 303 uploads the compressed document file to the cloud platform 103 (step S86). According to the third embodiment, even when the size of the document file exceeds the size of the file that can be uploaded to the cloud platform 103, the produced document file can be compressed to thereby upload the compressed file to the management server.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus that can communicate with a management server and user device, the information processing apparatus comprising:
a request reception unit configured to receive a document data production request from the user device;
a presenting unit configured to present to the user device a reception display, which receives an upload request for uploading the document data to the management server or a download request for downloading the document data to the user device;
a hardware document production unit configured to produce the document data in response to the document data production request;
a determining unit configured to perform a determination processing for determining whether or not the size of the produced document data exceeds a predetermined threshold value when the upload request is received via the reception display, wherein the determination processing is not performed when the download request is received via the reception display;
an uploading unit configured to upload the document data to the management server when the size of the document data is less than or equal to the threshold value;
a providing unit configured to provide a display that receives the download request of the document data, to the user device when the size of the document data exceeds the threshold value; and
a sending unit configured to send the document data to the user device when the download request is received via the display.

2. The information processing apparatus according to claim 1, wherein the uploading unit divides the document data into a plurality of divided data and uploads the plurality of divided data to the management server when the size of the document data exceeds the threshold value.

3. The information processing apparatus according to claim 2, wherein, when the uploading unit uploads the divided data to the management server, the uploading unit transmits list information about the divided data, which is used for combining the divided data, to the management server, and
wherein, when the management server receives a download request for the divided data that has been uploaded from the user device to the management server, the management server combines the uploaded divided data using list information about the divided data that has been transmitted from the uploading unit to download the combined divided data to the user device.

4. The information processing apparatus according to claim 1, wherein the uploading unit compresses the document data and uploads the compressed document data to the management server when the size of the document data exceeds the threshold value.

5. A document data producing method for producing document data in response to a request from a management server and a user device, the document data producing method comprising the steps of:
receiving a document data production request from the user device;
presenting to the user device a reception display, which receives an upload request for uploading the document data to the management server or a download request for downloading the document data to the user device;
producing the document data in response to the document data production request;
performing a determination processing for determining whether or not the size of the produced document data exceeds a predetermined threshold value when the upload request is received via the reception display, wherein the determination processing is not performed when the download request is received via the reception display;

uploading the document data to the management server when the size of the document data is less than or equal to the threshold value;

providing a display that receives the download request of the document data, to the user device when the size of the document data exceeds the threshold value; and sending the document data to the user device when the download request is received via the display.

6. The document data producing method according to claim 5, wherein the uploading step divides the document data into a plurality of divided data and uploads the plurality of divided data to the management server when the size of the document data exceeds the threshold value.

7. The document data producing method according to claim 6, wherein, when the divided data is uploaded to the management server, list information about the divided data, which is used for combining the divided data, is transmitted to the management server, and wherein, when the management server receives a download request for the divided data that has been uploaded from the user device to the management server, the management server combines the uploaded divided data using list information about the divided data that has been transmitted from the uploading unit to download the combined divided data to the user device.

8. The document data producing method according to claim 5, wherein the uploading step compresses the document data and uploads the compressed document data to the management server when the size of the document data exceeds the threshold value.

9. A non-transitory storage medium that stores a computer-readable program for producing document data in response to a request from a management server and a user device, wherein the program causes a computer to execute the steps of:

receiving a document data production request from the user device;

presenting to the user device a reception display, which receives an upload request for uploading the document data to the management server or a download request for downloading the document data to the user device;

producing the document data in response to the document data production request;

performing a determination processing for determining whether or not the size of the produced document data exceeds a predetermined threshold value when the upload request is received via the reception display, wherein the determination processing is not performed when the download request is received via the reception display;

uploading the document data to the management server when the size of the document data is less than or equal to the threshold value;

providing a display that receives the download request of the document data, to the user device when the size of the document data exceeds the threshold value; and sending the document data to the user device when the download request is received via the display.

10. The non-transitory storage medium according to claim 9, wherein the uploading step divides the document data into a plurality of divided data and uploads the plurality of divided data to the management server when the size of the document data exceeds the threshold value.

11. The non-transitory storage medium according to claim 10, wherein, when the divided data is uploaded to the management server, list information about the divided data, which is used for combining the divided data, is transmitted to the management server, and wherein, when the management server receives a download request for the divided data that has been uploaded from the user device to the management server, the management server combines the uploaded divided data using list information about the divided data that has been transmitted from the uploading unit to download the coupled divided data to the user device.

12. The non-transitory storage medium according to claim 9, wherein the uploading step compresses the document data and uploads the compressed document data to the management server when the size of the document data exceeds the threshold value.

* * * * *